United States Patent [19]

Mikalonis

[11] Patent Number: 4,625,267
[45] Date of Patent: Nov. 25, 1986

[54] STRIP LIGHTING FIXTURE FOR MASS TRANSIT VEHICLES

[75] Inventor: Liudas K. Mikalonis, Northville, Mich.

[73] Assignee: Transmatic, Incorporated, Waterford, Mich.

[21] Appl. No.: 655,863

[22] Filed: Sep. 28, 1984

[51] Int. Cl.$^4$ .................................................. F21S 1/02
[52] U.S. Cl. .................................... 362/150; 362/224; 362/225; 362/291
[58] Field of Search ............... 362/150, 148, 147, 151, 362/74, 224, 225, 217, 291, 290, 342, 404

[56] References Cited

U.S. PATENT DOCUMENTS

| | | | |
|---|---|---|---|
| 3,043,951 | 7/1962 | Tillson et al. | 362/224 |
| 3,113,728 | 12/1963 | Boyd | 362/147 |
| 3,210,875 | 10/1965 | Schwenkler | 362/74 |
| 3,512,313 | 5/1970 | Harg | 362/150 |
| 3,555,267 | 1/1971 | Sutter | 362/150 |
| 4,086,480 | 4/1978 | Lahm | 362/148 |
| 4,272,804 | 6/1981 | Blum | 362/148 |
| 4,338,653 | 7/1982 | Marrero | 362/151 |
| 4,494,175 | 1/1985 | Gavad et al. | 362/150 |

Primary Examiner—Magdalen Y. C. Greenlief
Attorney, Agent, or Firm—Reising, Ethington, Barnard, Perry & Milton

[57] ABSTRACT

A ceiling-mounted, recessed strip lighting fixture (10) is disclosed for mass transit vehicles. An uninterrupted lens module (18) extends throughout the length of two or more spaced apart lamp housings (14a, 14b) which are recessed into the ceiling (142,142'). The lens module comprises a central lens section (92) and a pair of oppositely disposed side lens sections (94,94') and is surface-mounted, relative to the ceiling, beneath the lamp housing. The central lens section is a light diffuser for distributing light along the entire length of the lens module. The side lens sections comprise prismatic lens elements for directing the light laterally of the lens module. The side lens sections support the central lens section in a sliding interlocking connection. The central diffuser section may be made up of plural parts which are disposed in end-to-end abutting engagement. The lens module is mounted on the lamp housing by a pair of spaced mounting tracks each of which includes a groove for receiving a connector tongue at the outboard edge of the side sections of the lens module.

5 Claims, 3 Drawing Figures

1

STRIP LIGHTING FIXTURE FOR MASS TRANSIT VEHICLES

FIELD OF THE INVENTION

This invention relates to lighting fixtures; more particularly, it relates to ceiling-mounted light fixtures for mass transit vehicles such as buses and trains.

BACKGROUND OF THE INVENTION

Ceiling-mounted light fixtures using fluorescent lamps are desirable in certain mass transit vehicles. Ceiling-mounted fixtures have been used for many years but there have been problems of space requirements, light distribution and aesthetic appearance. In the past, it has been a common practice to install surface mounted strip lighting fixtures extending over the aisle of the bus. Such a fixture provides aisle lighting and side lighting for the cornice or luggage compartment areas above the seats. The difficulty with this arrangment is that it interferes with the head room in the vehicle. Recessed lamp fixtures have been used with a lens below the ceiling for directing light downwardly to the aisle but without side lenses for providing lighting of the luggage rack or cornice of the bus. Heretofore, satisfactory lighting using recessed ceiling-mounted strip lighting fixtures has presented a problem by reason of the roof structure of the vehicle. In particular, a typical vehicle roof structure comprises a roof supported on a plurality of transverse beams or roof bows spaced along the length of the roof. A light fixture which is recessed into the ceiling must be limited in length to the distance between the roof bows. Heretofore in such an arrangement, a separate lens is provided with each fixture with a separation between the lenses. The installation of discrete light fixtures recessed into the ceiling with the ends of adjacent fixtures spaced apart solves the head room problem but it results in nonuniform lighting and an unattractive design. There is a need for an improved ceiling-mounted recessed fixture of the strip lighting type.

A general object of this invention is to provide an improved ceiling-mounted light fixture for mass transit vehicles which overcomes certain disadvantages of the prior art.

SUMMARY OF THE INVENTION

In accordance with this invention, a ceiling-mounted, recessed strip lighting fixture is provided for mass transit vehicles. An uninterrupted lens extends throughout the length of one, or if desired, two or more spaced apart lamp housings which include separate fluorescent lamps and are recessed into the ceiling. In the case of two or more lamp housings, this is accomplished by a lens module which is mounted on the spaced lamp housings beneath the ceiling. The lens module includes a light diffuser for distributing light from said lamps along the entire length of the lens module. The lens module also provides a controlled cornice or luggage rack lighting effect. The lens module may be stylized in shape and color as desired.

Further, according to this invention, a ceiling-mounted light fixture is provided which comprises one or more lamp housings of inverted channel-shape each having a mounting flange along each edge for mounting to the roof of a vehicle. The housings extend longitudinally of the vehicle with one of the roof bows therebetween. The flanges are substantially flush with the ceiling and each housing is adapted to receive a fluorescent lamp therein extending longitudinally. A lens module is supported from the housing and includes a central lens section extending longitudinally and a pair of oppositely disposed side lens sections coextensive with the central lens section. The lens module is supported by support means in alignment with said housings beneath the ceiling and is at least coextensive with the lamp housings.

Further, according to the invention, the central section of each lens module comprises a lattice with nonplanar boundary surfaces around each opening for producing light diffusion. Each of the side sections comprises a prismatic lens for directing the light laterally of the module.

Further, according to the invention, the lens module is mounted on a pair of spaced support tracks by a tongue and groove connection thereof with the respective edges of the side lens sections.

Further, according to the invention, the support tracks and the mounting flanges are adapted to be secured to structural members in the roof of the vehicle. Each support track has a mounting surface adapted to engage a respective mounting flange of the housing and also has an offset support flange spaced from the mounting flange to provide a slot for receiving the edge of a ceiling panel.

Further, according to the invention, each of the side sections of the lens module is connected by a longitudinal slidable interlocking connection with the central section.

A more complete understanding of this invention may be obtained from the detailed description that follows taken with the accompanying drawings.

BEST MODE FOR CARRYING OUT THE INVENTION

Figure 1:
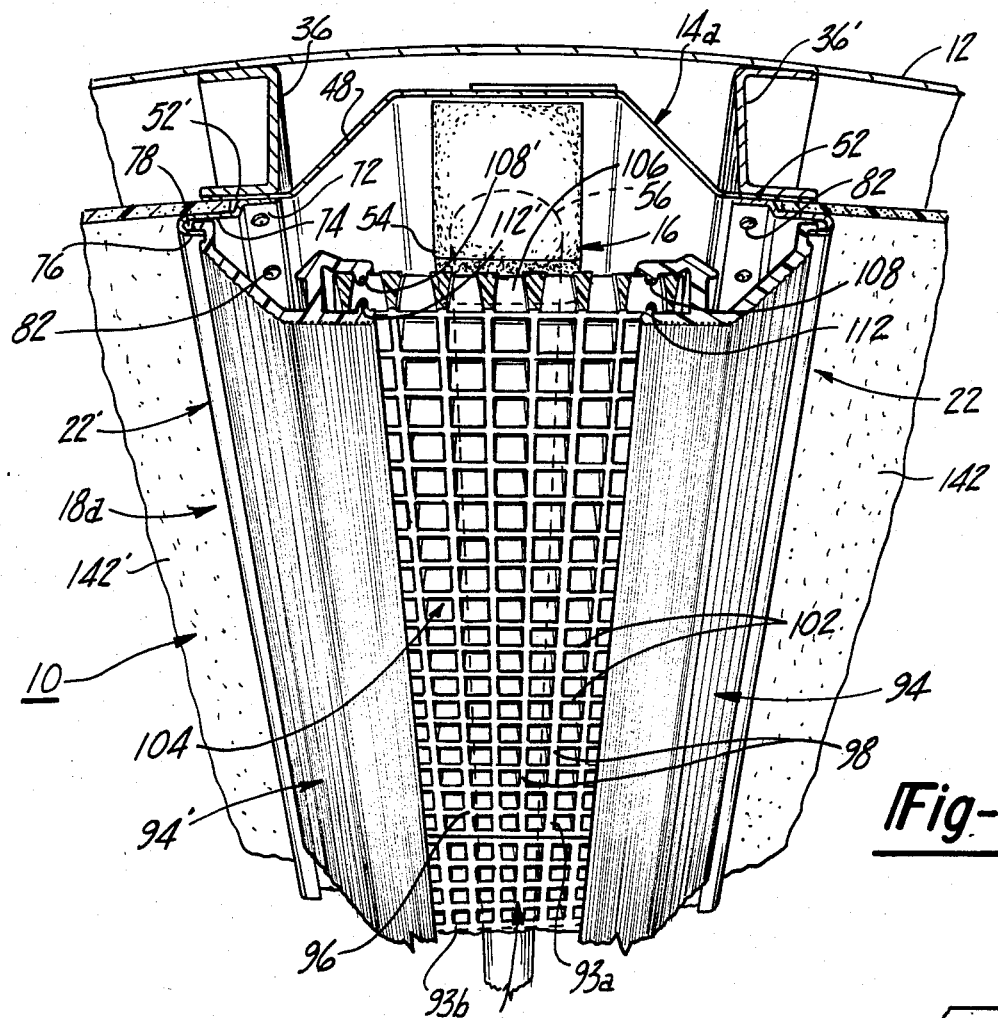
FIG. 1 is a pictorial view of a ceiling-mounted light fixture installed in a bus in accordance with this invention.

Referring now to the drawings, there is shown an illustrative embodiment of the invention in a ceiling-mounted light fixture for a bus. It will be appreciated as the description proceeds that the invention may be utilized in other embodiments.

FIG. 1 shows a ceiling-mounted light fixture 10 of this invention installed in a bus. The light fixture is mounted to the roof 12 over the center aisle of the bus and constitutes a so-called strip lighting fixture which runs lengthwise of the bus interior. The light fixture 10 comprises, in general, a lamp housing 14a which contains a fluorescent lamp 16 extending longitudinally thereof. It also comprises a lens module 18a which is supported by a pair of parallel support strips or tracks 22 and 22'. As will be described below, plural lamp housings 14 and 14a are disposed in alignment with each other and spaced apart as required by the structure of the roof 12 to recess the housings in the bus ceiling. The lens module 18a spans the plural lamp housings.

Figure 2:
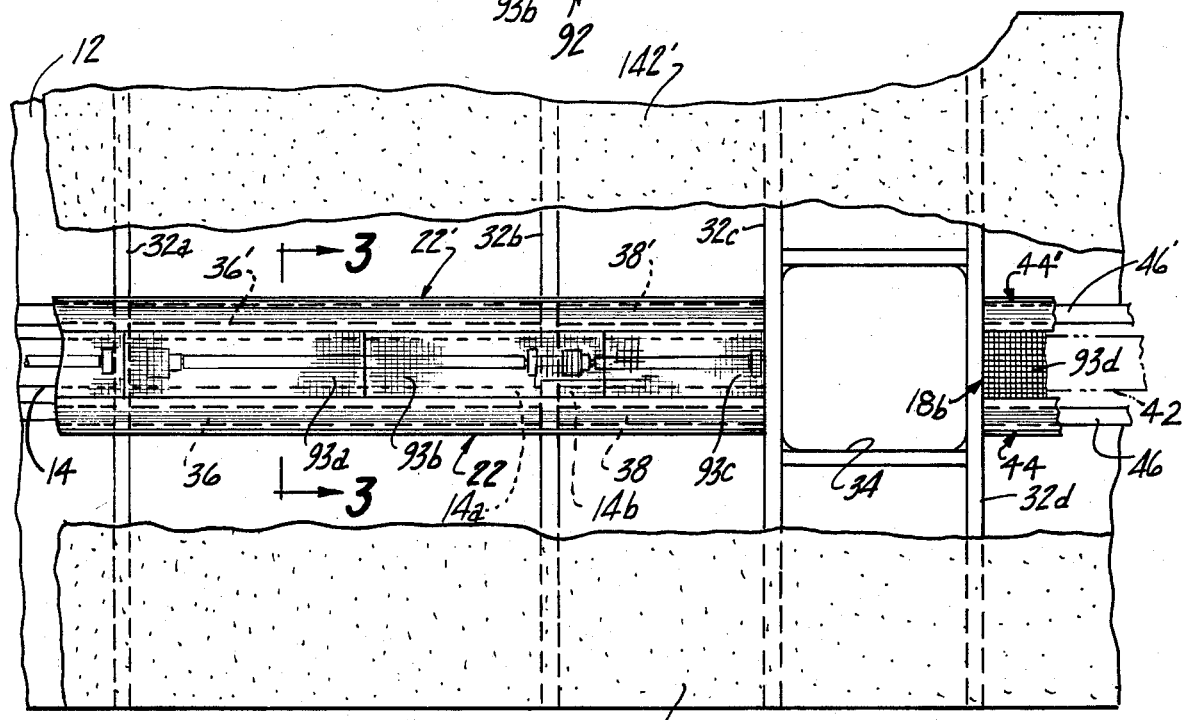
FIG. 2 is a layout showing the roof bows in a bus roof and the mounting relationship of the light fixtures of this invention.

The arrangement of the lamp housings 14 and 14a and the lens module 18a in relation to the structure of the bus roof 12 is shown in schematic fashion in FIG. 2. FIG. 2 shows a layout of a part of a bus roof structure representative of one type of bus. The roof 12 is supported by a plurality of transverse beams or roof bows 32a, 32b, 32c, and 32d which are disposed along the length of the bus according to various structural requirements. The roof 12 includes an emergency exit hatch 34. A pair of longitudinal lamp mounting members or beams 36 and 36' extend between an adjacent pair of roof bows 32a and 32b. Another pair of lamp mounting beams 38 and 38' are aligned with the beams 36 and 36', respectively, and extend between the roof bows 32b and 32c. The lamp housing 14a is disposed between the mounting beams 36 and 36' and has a length somewhat shorter than the space between the roof bows 32a and 32b. For example, with a space of approximately fifty-six inches between the roof bows 32a and 32b, a standard length lamp housing of forty-eight inches may be used. Another lamp housing 14b is mounted between the lamp mounting beams 38 and 38' and may, for example, be of substantially the same length as the distance between the roof bows 32b and 32c. The pair of suppport tracks 22 and 22' extend between the roof bows 32a and 32c in continuous fashion. The lens module 18a is mounted on the support tracks 22 and 22' and extends continuously between the roof bows 32a and 32c. An air conditioning vent 42 is mounted in the ceiling of the bus in the section adjoining the roof bow 32d. A pair of support tracks 44 and 44' are mounted on vent support members 46 and 46' and extend from the roof bow 32d to the next adjoining roof bow (not shown). A lens module 18b is mounted in the support tracks 44 and 44' so as to be coextensive with the air conditioning vent. The lens modules provides a decorative effect under the air conditioning vent without adverse interruption of air flow.

Figure 3:
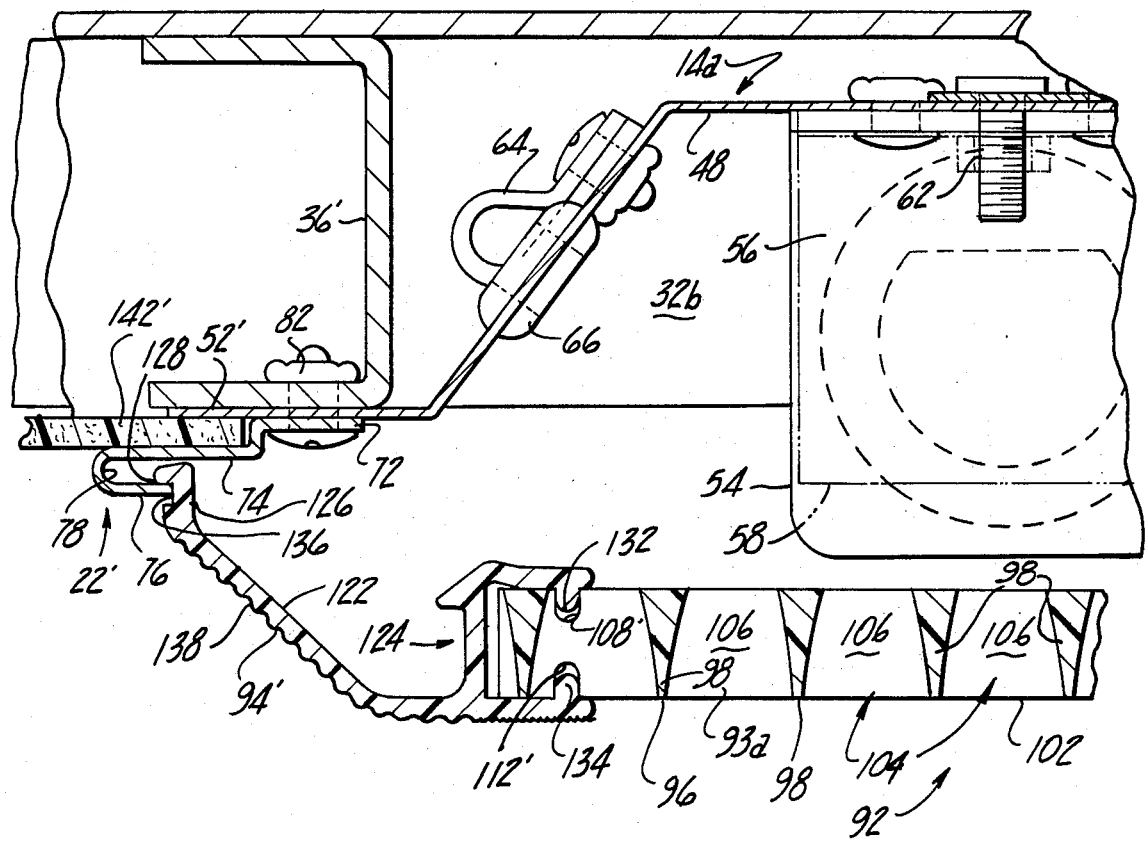
FIG. 3 is a view taken on lines 3—3 of FIG. 2.

The light fixture 10 will now be described in greater detail with reference to FIGS. 1 and 3. The lamp housing 14a comprises a panel 48 of trough or channel-shape which is provided with a pair of mounting flanges 52 and 52' extending along the lateral edges thereof. As will be described subsequently, the panel 48 is mounted between the mounting beams 36 and 36' by the mounting flanges 52 and 52' so that the housing 14a is recessed into the ceiling of the bus. The housing 14a includes a pair of socket members 54 (only one shown in FIG. 1) which are mounted on the base of the panel 48 by rivets. The fluorescent tube or lamp 16 is supported between the socket members 54. An electronic ballast 58 for the lamp is mounted within the housing 14a adjacent the socket member 54 and is suppported on the base of the panel 48 by a pair of bolts 62 (only one shown). Wire retainers, such as wire retainer 64, are mounted on the panel 48 for holding the electrical wiring for the lamp housing. A grommet 66 is mounted in an opening in the panel 48 for entry of the wiring through the panel wall. The mounting of the housing 14a to the lamp mounting beams 36 and 36' will be described in detail presently.

The support strips or tracks 22 and 22' are of identical structure and are preferably formed by extruded metal. Each support track comprises an inner mounting edge 72 with an adjoining offset mounting flange 74. The mounting flange 74 terminates in an in-turned outer edge 76 which defines a longitudinally extending groove 78. The mounting flange 52' of the lamp housing 14a and the mounting edge 72 of the support track 22' are secured to the mounting beam 36' by a plurality of rivets 82. Similarly, the mounting flange 52 and the mounting track 22 are secured to the mounting beam 36 by a plurality of rivets 82.

The lens module 18a comprises, in general, a central lens section 92 and a pair of oppositely disposed side lens sections 94 and 94' which are coextensive with the central lens section. The central section 92 is a light diffusing member and comprises a lattice 96 made up of longitudinal bars 98 and cross bars 102. The lattice 96 is preferably a unitary molded plastic structure. In comprises a multiplicity of apertures 104 defined by the longitudinal bars 98 and cross bars 102. Each aperture 104 is bounded by four faces 106 on the respective bars forming the aperture and each face 106 has a parabolic curvature in cross-section. The entire surface of the lattice 96 has a reflective coating, suitably of silver color. Due to the curvature of the faces 106, each aperture is of large cross-section at the bottom of the lattice than at the top. The lattice 96 is operative as a light diffuser. With a light source, such as a fluorescent tube, above the lattice the light rays impinging upon the faces of the multiple apertures exits through the bottom of the apertures as diffused light rays. It is notable that light from a source which is offset from an aperture by a distance of several aperture widths will impinge upon the walls of the remote apertures and diffused light will be transmitted therethrough. This effect, of course, diminishes with the offset distance of the light source. Nevertheless, lattice is operative to distribute diffused light over a relatively wide area even well beyond the end of a tubular light source such as a fluorescent lamp. This property of the central section 92 of the lens module will be described further presently. The lattice 96 is commerically available under the trademark "PARA-CUBE" from the American Louver Company. It is available in various lengths and widths with the largest length available of forty-eight inches. It can be readily sawed to the desired widths and lengths. For mounting purposes, the lattice 96 is provided with a pair of oppositely disposed grooves 108 and 112 adjacent one edge and a pair of oppositely disposed grooves 108' and 112' adjacent the other edge. These grooves are readily formed in the lattice by sawing. The center section 92 is made up of plural parts or diffuser modules 93a, 93b and 93c (see FIG. 2) as needed in end-to-end abutment and is coextensive with the side sections 94 and 94'.

The side sections 94 and 94' of the lens module 18a are of identical construction and the description thereof will be given with reference to the side section 94'. The side section 94' comprises, in general, a longitudinally extending light diffracting panel 122 terminating at its inboard edge in a support bracket or channel 124 and terminating in its outboard edge in a connector strip 126. The support channel 124 is of unitary construction with the panel 122 and is of channel-shaped cross-section with a pair of opposed beads 132 and 134 extending lengthwise of the channel adjacent the open side thereof. The channel 124 has an inside width approximately the same as the thickness of the lattice 96 and the beads 132 and 134 are located thereon so as to mate with the grooves 108' and 112'. The center section 92, i.e. the lattice 96, is assembled with the side section 94' by a sliding friction fit with the support channel 124. Thus, an interlocking connection between the central section 92 and the side section 94' is provided by the support channel 124 including the engagement of the beads 132 and 134 with the grooves 108' and 112'. This provides a rigid connection and yet it allows for relative movement as may be required by reason of a difference in thermal coefficient of expansion. The connector strip 126 at the outboard edge of the side section 94' is provided with a laterally extending tongue 128 which is undercut with a slot 136. The side section 94' is connected with the support track 22' by the connector strip 126 with the tongue 128 extending into the groove 78 and the free edge 76 of the track 22' being seated in the groove 136. The light diffracting panel 122 is preferably provided with a fluted surface 138 which includes prismatic elements for directing light rays from the lamp 56 laterally of the lens module so as to provide cornice or luggage rack lighting for the bus. The panel 122 including the unitary support channel 124 and the connector strip 126 are preferably formed as an extrusion of plastic material, such as polycarbonate. The side sections thus formed may be of any desired length; suitably, they are formed in a standard length of forty-eight or ninety-six inches and cut to the required length for a given installation.

As described above, the support tracks 22 and 22' include an offset support flange 74. With the support tracks 22 and 22' mounted on the respective lamp mounting beams 36 and 36', the offset support flanges 74 are adapted to receive and support the inboard edge of respective ceiling panels 142 and 142'. This arrangement facilitates installation of the ceiling panels and provides a slip fit to accommodate differential thermal expansion of the ceiling panels relative to the supporting structure therefor.

The installation of the lighting fixture 10 of this invention will now be described. The lamp housing 14a is first installed between the roof bows 32a and 32b, it being noted that a standard length forty-eight inch housing is selected, thus leaving a spacing at each end of the housing. The lamp housing 14b is suitably cut so that it fits, without excessive spacing between the roof bows 32b and 32c. The mounting tracks 22 and 22' are cut to length so as to reach from roof bow 32a to roof bow 32c. The lens module is formed by side sections 94 and 94' which span the full distance between the roof bows 32a and 32c. The diffuser modules 93a, 93b and 93c are cut to length so that the three diffuser modules in end-to-end abutting engagement span the distance between the roof bows 32a and 32c. This arrangement provides continuity of the lens module over the entire span. Further, the lens module is effective to distribute diffused light over the entire length of the span even though the fluorescent lamps are not coextensive with the length of the lens module. The light diffusion by the central section 92 is effective to avoid abrupt changes in light intensity along the length of the fixture. The lens module is installed on the support tracks 22 and 22' by inserting the tongue 128 into the groove 78 on one side and then flexing the connector strip 126 inwardly by hand pressure progressively along the connector strip 126 so that the tongue 128 is opposite the groove 78 and releasing it to allow the tongue to enter the groove. The lens unit may be removed by the reverse procedure to allow access to the lamp housing for changing the fluorescent lamps.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A ceiling-mounted light fixture for mass transit vehicles of the type having plural roof bows spaced along the length of the vehicle, said fixture comprising:
    a plurality of lamp housings of inverted channel shape each having first and second mounting flanges along opposite edges and adapted to be mounted to the roof of a vehicle with flanges substantially flush with the ceiling and having a fluorescent lamp therein extending longitudinally thereof,
    said lamp housings extending longitudinaly of the vehicle between successive roof bows with the ends of adjacent housings being spaced apart by at least the thickness of said roof bows,
    a lens module including a central lens section extending longitudinally of said housings and first and second oppositely disposed side lens sections which are coextensive with said central lens section,
    and support means for supporting said lens module from said roof in alignment with said lamp housings and below said ceiling,
    said lens module extending the entire length of said plurality of lamp housings and thereby covering said housings and the space between the ends thereof,
    said central lens section being a light diffuser for distributing light from said lamps along the entire length of said lens module.
2. The invention as defined in claim 1 wherein,
    said central lens section of said lens module comprises a lattice with the boundary surface of each opening thereof being nonplanar for producing light diffusion,
    and each of side lens sections comprises a prismatic lens for directing light laterally of said module.
3. The invention as defined in claim 1 wherein said support means comprises,
    first and second parallel support tracks secured to said first and second mounting flanges, respectively, and extending longitudinally thereof, each of said tracks defining a longitudinal groove,
    first and second lateral tongues on the first and second side lens sections being disposed in the respective grooves in said first and second support tracks for supporting said lens module.
4. The invention as defined in claim 3 wherein,
    said support tracks and said mounting flanges are adapted to be secured to lamp support members extending between said roof bows,
    each support track having a mounting surface adapted to engage a respective mounting flange of said housing and having an offset support flange spaced from said mounting flange providing a slot therebetween adapted to receive the edge of a ceiling panel to support said panel.
5. The invention as defined in claim 1 wherein,
    each of said side lens sections of said lens module is unitary and said central lens section comprises at least two discrete parts in end-to-end abutment with each other,
    the inboard edges of said side lens sections defining a pair of opposed guide channels,
    and the outer edges of each of said discrete parts of said central lens section being slidably disposed in said guide channels.

* * * * *